United States Patent

[11] 3,624,112

[72] Inventors Alberto Ercoli
Milan;
Rinaldo Gardi, Carate Brianza (Milan);
Romano Vitali, Casatenovo (Como), all of Italy
[21] Appl. No. 884,009
[22] Filed Dec. 10, 1969
[45] Patented Nov. 30, 1971
[73] Assignee Warner-Lambert Company
Morris Plains, N.J.
[32] Priorities Dec. 11, 1968
[33] Italy
[31] 24885 A/68;
Dec. 11, 1968, Italy, No. 24886 A/68; July 25, 1969, Italy, No. 20105 A/69; July 25, 1965, Italy, No. 20106 A/69

[54] LONG-ACTING STEROIDS OF THE ESTROGENIC SERIES
42 Claims, No Drawings

[52] U.S. Cl. .................................................. 260/397.5, 260/397.4, 260/999
[51] Int. Cl. ........................................................ C07c 169/08
[50] Field of Search ............................................. Machine Searched Steroids; 260/397.5

[56] References Cited
UNITED STATES PATENTS

| | | | |
|---|---|---|---|
| 3,135,744 | 6/1964 | Ercoli et al. .................. | 260/239.55 |
| 3,242,198 | 3/1966 | Ercoli et al. .................. | 260/397.4 |
| 3,417,183 | 12/1968 | Ercoli et al. .................. | 424/243 |

*Primary Examiner*—Henry A. French
*Attorneys*—Albert H. Graddis, Henry E. Millson, Jr. and Frank S. Chow ABSTRACT: $C_7$-$C_{29}$ 17-cycloalkenyl ethers of estradiol 3-benzoate or substituted benzoate having prolonged contraceptive and estrogenic activity are obtained by reacting estradiol 3-benzoate or substituted benzoate with a functional derivative of a cyclic ketone at a temperature higher than 70° C.

LONG-ACTING STEROIDS OF THE ESTROGENIC SERIES

This invention relates to novel long-acting steroids of the estrogenic series. More particularly, this invention relates to $C_7$-$C_{29}$ 17-cycloalkenyl ethers of estradiol 3-benzoate and to novel compositions having prolonged contraceptive and estrogenic activity containing said $C_7$-$C_{29}$ 17-cycloalkenyl ethers of estradiol 3-benzoate as active ingredients.

The novel compounds of the present invention are characterized by the following general formula

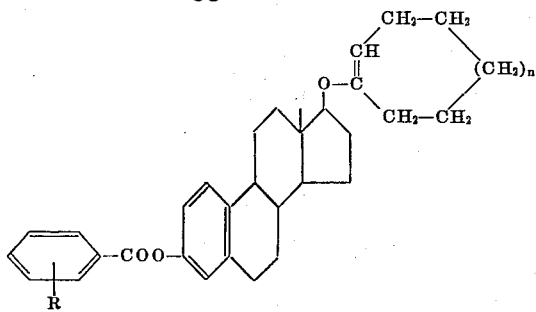

I wherein R is selected from the group consisting of hydrogen, halogen, a lower alkyl, lower alkoxy, cycloalkoxy and nitro group, n is an integer of from 1 to 23 inclusive.

With the term "lower" we mean a number of carbon atoms in the molecule from 1 to 3 inclusive.

Typical examples of the above substituents at the benzene ring are: methyl, ethyl, propyl, isopropyl, methoxy, ethoxy, propoxy, cyclopentyloxy, cyclohexyloxy, fluorine or chlorine. Particularly preferred are those compounds carrying the substituent in the paraposition of the benzene ring.

The compounds of the invention proved to possess interesting pharmacological properties which made them usefully employed as uterotrophic and contraceptive agents in warm-blooded animals. They are suitable for the oral as well as for the parenteral administration. Further, thanks to their good solubility in oil, they can be easily administered in a single dose to obtain a prolonged effect.

In accordance with the invention, the new compositions having long-lasting contraceptive and estrogenic activity, contain as active ingredients the compounds of formula I in admixture with an inert solid or liquid pharmaceutical carrier.

Such compositions contain the active ingredient in an amount of from about 0.1 to about 100 mg., preferably from 0.5 to 20 mg., and may be in form of tablets, powders, capsules, ampuls or multiple dose flacons and other pharmaceutical forms suitable for the oral or the parenteral administration.

PHARMACOLOGICAL DATA

A. Determination of the prolonged uterotrophic activity

The compounds under testing in solution of sesame oil were administered subcutaneously in a single dose of 0.05 μmole to spayed rats weighing about 45–50 g. Groups of rats were sacrificed, respectively, at the end of the 4th 8th and 12th week from the administration, and the uterus weight of the treated animals and of the controls was determined on a torsion balance. The increase of the uterus weight was considered as an index of the estrogenic activity.

The results obtained are summarized in table I in which the uterotrophic activity of some representative compounds of the invention, is compared with that of estradiol 17-enanthate, one of the most long-acting estrogenic agents known so far.

TABLE I

| | Uterus weight (mg.) after— | | |
|---|---|---|---|
| | 4 weeks | 8 weeks | 12 weeks |
| Controls | 19.5±6.3 | 23.0±1.7 | 22.5±2.01 |
| Estradiol 17-enanthate | 128.5±5.3 | 104.4±10.5 | 71.3±3.76 |
| Estradiol 3-p-chlorobenzoate 17-(1'-cyclooctenyl)ether | 195.2±9.6 | 164.4±13.4 | 142.1±8.17 |
| Estradiol 3-p-fluorobenzoate 17-(1'-cyclooctenyl)ether | 194.3±7.4 | 180.5±9.5 | 124.7±8.97 |
| Estradiol 3-anisate 17-(1'-cyclooctenyl)ether | 207.9±7.2 | 174.9±16.0 | 118.4±10.30 |
| Estradiol 3-benzoate 17-(1'-cycloheptenyl)ether | 209.3±15.7 | 154.1±11.9 | (1) |
| Estradiol 3-benzoate 17-(1'-cyclooctenyl)ether | 163.9±17.8 | 159.5±14.6 | (1) |
| Estradiol 3-benzoate 17-(1'-cyclononenyl)ether | 208.0±9.0 | 162.0±12.4 | 131.6±8.34 |
| Estradiol 3-benzoate 17-(1'-cyclodecenyl)ether | 120.3±15.5 | 138.2±10.2 | (1) |
| Estradiol 3-benzoate 17-(1'-cyclododecenyl)ether | 90.3±17.2 | 165.4±16.6 | (1) |
| Estradiol 3-benzoate 17-(1'-cyclopentadecenyl)ether | 171.5±12.4 | 194.8±9.8 | 170.4±15.2 |
| Estradiol 3-o-chlorobenzoate 17-(1'-cyclooctenyl)ether | 146.0±15.3 | 158.8±12.9 | 157.7±19.9 |
| Estradiol 3-m-chlorobenzoate 17-(1'-cyclooctenyl)ether | 163.2±5.2 | 165.0±6.8 | 187.6±8.1 |

[1] Data not evaluated.

Table I shows that the compounds according to the invention exhibit an estrogenic activity greater and much more prolonged than that of the standard compound.

More particularly, it results that even 12 weeks after the treatment some of the compounds of the invention still possess an uterotrophic activity at least equal to that displayed by the standard compound at the end of the 4th week.

B. Determination of the contraceptive activity

The contraceptive activity was determined in mature Wistar female rats weighing about 150–170 g. The compounds under testing, in sesame oil solution, were injected subcutaneously in a single dose of 0.5 μmole and on the next day the treated animals were caged with fertile males and kept therewith till pregnant, and afterwards, on days 15–18 of pregnancy, the females were put in single cages.

The results of this investigation are summarized in table II, were it is indicated the situation on the 160th day from the administration.

TABLE II

| | | Number of rats— | | | | |
|---|---|---|---|---|---|---|
| | | On day 160 | | | | |
| Compounds administered | Treated (day zero) | Delivered [1] | Miscarried | Killed [2] | Dead | Not pregnant |
| Controls | 10 | 9 (27.6) | | | 1 | |
| Estradiol 3-p-chlorobenzoate 17-(1'-cyclooctenyl)ether | 10 | | | | | 10 |
| Estradiol 3-p-fluorobenzoate 17-(1'-cyclooctenyl)ether | 10 | 4 (137.7) | | | | 6 |
| Estradiol 3-anisate 17-(1'-cyclooctenyl)ether | 10 | 5 (137.4) | 1 | | 1 | 3 |
| Estradiol 3-benzoate 17-(1'-cycloheptenyl)ether | 10 | 2 (153.0) | | 3 | | 5 |
| Estradiol 3-benzoate 17-(1'-cyclooctenyl)ether | 10 | | | 1 | 2 | 7 |
| Estradiol 3-benzoate 17-(1'-cyclononenyl)ether | 10 | | | 1 | 1 | 8 |
| Estradiol 3-benzoate 17-(1'-cyclodecenyl)ether | 10 | 2 (139.5) | 1 | 1 | 1 | 5 |
| Estradiol 3-benzoate 17-(1'-cyclododecenyl)ether | 10 | | | | | 10 |

[1] In parentheses ( ) the average number of days from treatment to delivery.
[2] For difficult delivery or probable reabsorption.

Table II shows that, when injected in a single dose of 0.5 μmole the compounds of the invention did not allow any pregnancy for at least 15 weeks, while the controls delivered within 4 weeks.

In particular, on the 160th day from the beginning of the experiment none of the rats treated with estradiol 3-p-chlorobenzoate 17-(1'-cyclooctenyl) ether as well as estradiol 3-benzoate 17-(1'-cyclododecenyl) ether became pregnant.

The novel compounds of this invention may be prepared by reacting estradiol 3-ester intermediates of formula

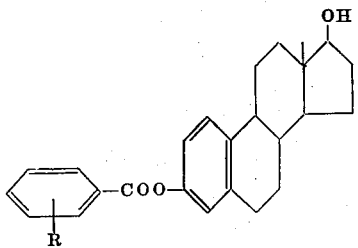

wherein R has the above stated meaning, with a functional derivative of a cyclic ketone of formula

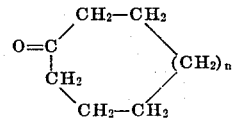

wherein n has the above stated meaning, at a temperature higher than 70° C.

The term "functional derivatives" means the typical derivatives of the ketones of formula III above with lower aliphatic alcohols. Such functional derivatives are lower alkyl acetals or lower alkyl enol ethers containing from 1 to 3 carbon atoms as well as mixtures thereof as obtained by reaction of the free ketone with a lower alkyl orthoformate, the methyl and ethyl enol ethers and/or dimethyl and diethyl acetals being preferred.

The reaction is carried out under anhydrous conditions, preferably in the presence of an acid catalyst and in an organic solvent, such as, for example benzene, toluene, xylene or dimethylformamide. After about 1 hour the reaction is over and the end product can be isolated according to usual procedures, for example by neutralizing the catalyst, if any, evaporating the solvent and crystallizing the residue from a suitable solvent.

Also included in the present invention is the description and preparation of new estradiol 3-esters, starting materials for some of the compounds of the invention. These new estradiol 3-esters, namely the compounds of formula II in which R is selected from the group consisting of a lower alkyl, lower alkoxy, cycloalkoxy, a nitro group and an halogen atom, are prepared by treating estrone with an esterifying agent derived from a substituted benzoic acid, for example an anhydride or a chloride, under usual esterification conditions and then reducing the estrogen 3-ester thus obtained with an alkali metal hydride, for example sodium borhydride, to convert the 17-keto group into a 17β-hydroxy group.

The following examples are given to illustrate the invention without limiting it.

PREPARATION I

To a solution of 10 g. of estrone in 100 ml. of pyridine cooled to 0° C. there is added 5 ml. of p-chlorobenzoylchloride. The reaction mixture is maintained overnight at room temperature and then poured into ice-water. The precipitate, filtered off and recrystallized from a methanol-methylene chloride mixture, yields 14.2 g. of estrone 3-p-chlorobenzoate, melting at 199°–204° C. A pure sample of the product melts at 215°–217° C.

In the same manner estrone 3-m-chlorobenzoate melting point 212°–214° C.; and estrone 3-o-chlorobenzoate, melting point 214°–216° C. are obtained.

PREPARATION II

To a solution of 5 g. of estrone in 50 ml. of pyridine cooled to 0° C. there is added 3 ml. of p-fluorobenzoyl chloride. The reaction mixture is maintained overnight at room temperature and then poured into ice-water. So there is obtained estrone 3-p-fluorobenzoate which after crystallization from a methanol-methylene chloride mixture melts at 210°–212° C.

In the same manner estrone 3-m-fluorobenzoate and estrone 3-o-fluorobenzoate are obtained.

PREPARATION III

A solution of 5 g. of estrone in 50 ml. of pyridine is cooled to 0° C. and treated with 3 ml. of p-methoxybenzoylchloride. By operating as in Preparation I estrone 3-anisate is obtained, melting point 229°–231° C.

In the same manner estrone 3-m-methoxybenzoate and estrone 3-o-methoxybenzoate are obtained.

PREPARATION IV

By reacting estrone with p-nitrobenzoylchloride, p-cyclopentyloxybenzoylchloride and p-toluylchloride and following the procedure set forth in Preparation I estrone p-nitrobenzoate, estrone p-cyclopentyloxybenzoate and estrone p-toluate are obtained, respectively.

EXAMPLE 1

To a solution of 10 g. of estrone 3-p-chlorobenzoate in 320 ml. of tetrahydrofurane is added with stirring a solution of 2 g. of sodium borhydride in 10 ml. of water. After stirring for an additional 3 hours, the mixture is treated with 10 ml. of a 10 percent solution of acetic acid and evaporated in vacuo. The residue is taken up in water, filtered off and crystallized from a methylene chloride-diethyl ether mixture to obtain 6.3 g. of estradiol 3-p-chloro-benzoate, melting point 183°–185° C., $[\alpha]_D^{24}=+52°$ (dioxane, c=0.5%).

In the same manner estradiol 3-m-chlorobenzoate, melting point 166°–169° C., $[\alpha]_D^{24}=+53.5°$ (dioxane, c=0.5 percent) and estradiol 3-o-chlorobenzoate, melting point 168°–172° C., $[\alpha]_D^{24}=+55.5°$ (dioxane, c=0.5 percent) are obtained.

An anhydrous mixture of 2 g. of estradiol 3-p-chlorobenzoate and 20 mg. of p-toluenesulphonic acid in 700 ml. of toluene is treated with 2 ml. of cyclooctanone methyl enol ether and then distilled over a period of about 40 minutes. After addition of several drops of pyridine to neutralize the acid catalyst, the mixture is evaporated in vacuo and the solid residue thus obtained is taken up in methanol and filtered. The product, recrystallized from a methylene chloride-methanol mixture, yields 2.13 g. of estradiol 3-p-chlorobenzoate 17-(1'-cyclooctenyl)ether, melting point 172°–174° C., $[\alpha]_D^{24}=+47°$ (dioxane, c=0.5 percent).

UV:$\lambda_{max}$ 241–243 m$\mu$; $E_{1cm}^{1\%}$=415.

In the same manner estradiol 3-m-chlorobenzoate 17-(1'-cyclooctenyl)ether, melting point 150°–152° C., $[\alpha]_D=+49.8°$ (dioxane, c=0.5 percent) and estradiol 3-o-chlorobenzoate 17-(1'-cyclooctenyl)ether, melting point 151°–153° C., $[\alpha]_D^{24}=+51°$ (dioxane, c=0.5 percent), are obtained.

EXAMPLE 2

An anhydrous mixture of 2 g. of estradiol 3-p-chlorobenzoate, 3 ml. of cycloheptanone dimethyl acetal, 20 mg. of pyridine tosylate and 700 ml. of toluene is distilled over a period of about 40 minutes. The acid catalyst is then neutralized with several drops of pyridine and the mixture is concentrated in vacuo to dryness. The residue, taken up with a methylene chloride-methanol mixture, yields the estradiol 3-p-chlorobenzoate 17-(1'-cycloheptenyl)ether, melting point 156°–158° C., $[\alpha]_D=+53°$ (dioxane, c=1 percent).

EXAMPLE 3

An anhydrous mixture of 2 g. of estradiol 3-p-chlorobenzoate, 3 ml. of cyclononanone methyl enol ether, 20 mg. of p-toluenesulfonic acid and 800 ml. of toluene is distilled over a period of about 40 minutes. The acid catalyst is then neutralized with several drops of pyridine and the mixture is concentrated in vacuo to dryness. The residue taken up with a methylene chloride-methanol mixture yields the estradiol 3-p-chlorobenzoate 17-(1'-cyclononenyl)ether.

In the same manner estradiol 3-p-chlorobenzoate 17-(1'-cyclododecenyl)ether is obtained, melting point 145°–147° C., $[\alpha]_D^{24} = +43°$ (dioxane, $c=0.5$ percent).

UV:$\lambda_{max}$ 241–242 m$\mu$; $E_{1cm}^{1\%} = 391$.

EXAMPLE 4

To a stirred solution of 10 g. of estrone 3-p-fluorobenzoate in 320 ml. of tetrahydrofurane is added with stirring a solution of 2 g. of sodium borhydride in 10 ml. of water. After stirring for an additional 3 hours, the mixture is treated with 10 ml. of a 10 percent solution of acetic acid and evaporated in vacuo. The residue, taken up in water, filtered off and crystallized from a methylene chloride-diethyl ether mixture, yields estradiol 3-p-fluorobenzoate, melting point 210°–212° C., $[\alpha]_d^{24} = +56°$ (dioxane, $c=0.5$ percent).

In the same manner estradiol 3-m-fluorobenzoate, and estradiol 3-o-fluorobenzoate are obtained.

An anhydrous mixture of 2 g. of estradiol 3-p-fluorobenzoate and 20 mg. of p-toluenesulphonic acid in 700 ml. of toluene is treated with 2 ml. of cyclooctanone methyl enol ether and then distilled over a period of about 40 minutes. After addition of several drops of pyridine to neutralize the acid catalyst, the mixture is evaporated in vacuo and there is obtained a solid residue which is taken up in methanol and filtered. The product, recrystallized from a methylene chloride-methanol mixture, yields estradiol 3-p-fluorobenzoate 17-(1'-cyclooctenyl)ether, melting point 141°–144° C., $[\alpha]_D^{24} = +48°$ (dioxane, $c=0.5$ percent).

UV:$\lambda_{max}$ 228–230 m$\mu$; $E_{1cm}^{1\%} = 368$.

In the same manner estradiol 3-p-fluorobenzoate 17-(1'-cyclodecenyl)ether, melting point 164°–166° C., $[\alpha]_D^{24} = +55°$ (dioxane, $c=0.5$ percent) and estradiol 3-p-fluorobenzoate 17-(1'-cyclododecenyl) ether, melting point 152°–154° C., $[\alpha]_D^{24} = +48.5°$ (dioxane, $c=0.5$ percent) are obtained.

EXAMPLE 5

To a solution of 10 g. of estrone 3-anisate in 320 ml. of tetrahydrofurane is added with stirring a solution of 2 g. of sodium borhydride in 10 ml. of water. After stirring for an additional 3 hours, the mixture is treated with 10 ml. of a 10 percent solution of acetic acid and evaporated in vacuo. The residue taken up in water, filtered off and crystallized from a methylene chloridediethyl ether mixture, yields estradiol 3-anisate, melting point 195°–197° C., $[\alpha]_D^{24} = +53°$ (dioxane, $c=0.5$ percent).

In the same manner estradiol 3-m-methoxybenzoate, and estradiol 3-o-methoxybenzoate are obtained.

An anhydrous mixture of 2 g. of estradiol 3-anisate and 20 mg. of p-toluenesulphonic acid in 700 ml. of toluene is treated with 2 ml. of cyclooctanone methyl enol ether and then distilled over a period of about 40 minutes. After addition of several drops of pyridine to neutralize the acid catalyst, the mixture is evaporated in vacuo and there is obtained a solid residue which is taken up in methanol and filtered. The product, recrystallized from a methylene chloride-methanol mixture, yields estradiol 3-anisate 17-(1'-cyclooctenyl)ether, melting point 149°–151° C., $[\alpha]_D^{24} = +48°$ (dioxane, $c=0.5$ percent).

UV:$\lambda_{max}$ 260–261 m$\mu$; $E_{1cm}^{1\%} = 461$.

In the same manner estradiol 3-anisate 17-(1'-cyclododecenyl)ether, melting point 119°–121° C., $[\alpha]_D = +46.8°$ (dioxane, $c=0.05$ percent) is obtained.

According to the method set forth above, by reducing estrone 3-p-nitrobenzoate with sodium borhydride, estradiol 3-p-nitrobenzoate is obtained, which is reacted with cyclooctanone methyl enol ether to obtain estradiol 3-p-nitrobenzoate 17-(1'-cyclooctenyl)ether, melting point 220°–223° C., $[\alpha]_D = +44°$ (dioxane, $c=1$ percent).

Analogously, estrone 3-p-cyclopentyloxybenzoate is reduced to estradiol 3-p-cyclopentyloxybenzoate, which is converted into estradiol 3-p-cyclopentyloxybenzoate 17-(1'-cyclooctenyl)ether, melting point 200°–202° C., $[\alpha]_D = +44°$ (dioxane, $c=1$ percent) by reaction with cyclooctanone methyl enol ether.

In the same manner estradiol 3-p-toluate (obtained by reduction of estrone p-toluate with NaBH$_4$) is reacted with cyclooctanone methyl enol ether to obtain estradiol 3-p-toluate 17-(1'-cyclooctenyl)ether, melting point 164°–166° C., $[\alpha]_D = +51.5°$ (dioxane, $c=1$ percent).

Analogously estradiol 3-p-toluate is reacted with cyclododecanone dimethyl acetale to obtain estradiol 3-p-toluate 17-(1'-cyclododecenyl)ether, melting point 139°–142° C., $[\alpha]_D = +46.3°$ (dioxane, $c=1$ percent).

EXAMPLE 6

A mixture of 1.5 g. of exaltone (cyclopentadecanone), 2 cc. of methanol, 1.5 cc. of methyl orthoformate and 15 mg. of p-toluenesulfonic acid is heated at 60°–70° C. for 30 minutes. The reaction mixture, containing a mixture of methyl enol ether and dimethylacetal of exaltone, is treated with 5 cc. of dimethylformamide and 2.2 g. of estradiol 3-p-chlorobenzoate, then it is heated under nitrogen atmosphere at about 160° C. for 1 hour. After addition of a few drops of pyridine to neutralize the acid catalyst, the mixture is evaporated and the residue, crystallized from methanol-methylene chloride, gives estradiol 3-p-chlorobenzoate 17-(1'-cyclopentadecenyl)ether.

In an analogous manner there are obtained the 17-(1'-cyclotridecenyl)ether, the 17-(1'-cycloeptadecenyl)ether, the 17-(1'A-cycloheneicosenyl)ether and the 17-(1'-cyclononacosenyl)ether of estradiol 3-p-chlorobenzoate.

EXAMPLE 7

An anhydrous mixture of 2 g. of estradiol 3-benzoate and 20 mg. of p-toluenesulfonic acid in 700 ml. of toluene is treated with 2 ml. of cyclooctanone methyl enol ether and then distilled over a period of about 40 minutes. After addition of several drops of pyridine to neutralize the acid catalyst, the mixture is evaporated in vacuo and the solid residue thus obtained is taken up in methanol and filtered. The product, recrystallized from a methylene chloride-methanol mixture, yields estradiol 3-benzoate 17-(1'-cyclooctenyl)ether, melting point 174°–176° C., $[\alpha]_D^{24} = +52°$ (dioxane, $c=0.5$ percent).

EXAMPLE 8

An anhydrous mixture of 2 g. of estradiol 3-benzoate, 3 ml. of cycloheptanone dimethyl acetal, 20 mg. of pyridine tosylate and 700 ml. of toluene is distilled over a period of about 40 minutes. The acid catalyst is then neutralized with several drops of pyridine and the mixture is concentrated in vacuo to dryness. The residue, taken up in a methylene chloride-methanol mixture, yields the estradiol 3-benzoate 17-(1'-cycloheptenyl)ether, melting point 149°–151° C., $[\alpha]_D^{24} = +57°$ (dioxane, $c=0.5$ percent).

In the same manner estradiol 3-benzoate 17-(1'-cyclononenyl)ether, melting point 151°–155° C., $[\alpha]_D^{24} = +52.5°$ (dioxane, $c=0.5$ percent), estradiol 3-benzoate 17-(1'-cyclodecenyl)ether, melting point 149°–151° C., $[\alpha]_D^{24} = +57°$ (dioxane, $c=0.5$ percent), estradiol 3-benzoate 17-(1'-cyclododecenyl)ether, melting point 163°–166° C., $[\alpha]_D^{24} = +51°$ (dioxane, $c=0.5$ percent) and estradiol 3-benzoate 17-(1'-cyclodocosenyl)ether, melting point 107°–110° C., $[\alpha]_D = +30.6°$ (dioxane, $c=1$ percent), are obtained.

EXAMPLE 9

A mixture of 1.5 g. of exaltone (cyclopentadecanone), 2 cc. of methanol, 1.5 cc. of methylorthoformate and 15 mg. of p- toluenesulfonic acid is heated for 30 minutes at 60°–70° C. The reaction mixture, containing a mixture of methyl enol ether and dimethylacetal of exaltone, is treated with 5 cc. of dimethylformamide and 2.2 g. of estradiol 3-benzoate, then heated under nitrogen atmosphere at about 160° C. for 1 hour. After addition of a few drops of pyridine to neutralize the acid catalyst, the mixture is evaporated and the residue, crystallized from methanol-methylene chloride, gives estradiol 3-benzoate 17-(1'-cyclopentadecenyl)ether. Melting point 136°–139° C., $[\alpha]_D^{24}=+40.5°$ (dioxane, $c=1$ percent).

In the same manner, the 17-(1'-cyclotridecenyl)ether, the 17-(1'-cycloheptadecenyl)ether, the 17-(1'-cycloheneicosenyl)ether, and the 17-(1'-cyclononacosenyl)ether of estradiol 3-benzoate are obtained.

EXAMPLE 10

500 mg. of estradiol 3-p-chlorobenzoate 17-(1'-cyclooctenyl)ether is dissolved in 100 ml. of sesame oil and the solution is poured into 1 ml. ampuls so that each ampul contains 5 mg./ml. of the active substance.

EXAMPLE 11

A solution of 200 mg. of estradiol 3-p-chlorobenzoate 17-(1'-cyclooctenyl)ether in 100 ml. of sesame oil is poured into 1 ml. ampuls to obtain ampuls containing 2 mg./ml. of the active substance.

EXAMPLE 12

500 mg. of estradiol 3-benzoate 17-(1'-cyclooctenyl)ether is dissolved in 100 ml. of sesame oil and the solution is poured into 1 ml. ampuls so that each ampul contains 5 mg./ml. of the active substance.

EXAMPLE 13

A solution of 200 mg. of estradiol 3-benzoate 17-(1'-cyclododecenyl)ether in 100 ml. of sesame oil is poured into 1 ml. ampuls to obtain ampuls containing 2 mg./ml. of the active substance.

We claim:

1. A compound of the formula

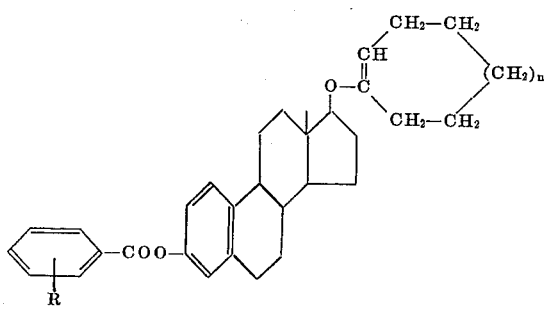

wherein R is selected from the group consisting of hydrogen, halogen, lower alkyl, lower alkoxy, cycloalkoxy and nitrogroup and $n$ is an integer of from 1 to 23 inclusive.

2. A compound according to claim 1 in which R is in para position of the benzene ring.

3. A compound according to claim 2 in which R is selected from the group consisting of chloro, fluoro and methoxy.

4. A compound according to claim 1 in which $n$ is 7.

5. A compound according to claim 1 in which $n$ is 8.

6. A compound according to claim 1 in which $n$ is 9.

7. A compound according to claim 1 in which $n$ is 10.

8. A compound according to claim 1 in which $n$ is 12.

9. A compound according to claim 1 in which $n$ is 15.

10. Estradiol 3-p-chlorobenzoate 17-(1'-cyclooctenyl)ether.

11. Estradiol 3-m-chlorobenzoate 17-(1'-cyclooctenyl)ether.

12. Estradiol 3-o-chlorobenzoate 17-(1'-cyclooctenyl)ether.

13. Estradiol 3-p-chlorobenzoate 17-(1'-cycloheptenyl)ether.

14. Estradiol 3-p-chlorobenzoate 17-(1'-cyclononenyl)ether.

15. Estradiol 3-p-chlorobenzoate 17-(1'-cyclododecenyl)ether.

16. Estradiol 3-p-fluorobenzoate 17-(1'-cyclooctenyl)ether.

17. Estradiol 3-p-fluorobenzoate 17-(1'-cyclodecenyl)ether.

18. Estradiol 3-p-fluorobenzoate 17-(1'-cyclododecenyl)ether.

19. Estradiol 3-anisate 17-(1'-cyclooctenyl)ether.

20. Estradiol 3-anisate 17-(1'-cyclododecenyl)ether.

21. Estradiol 3-p-nitrobenzoate 17-(1'-cyclooctenyl)ether.

22. Estradiol 3-p-cyclopentyloxybenzoate 17-(1'-cyclooctenyl)ether.

23. Estradiol 3-p-toluate 17-(1'-cyclooctenyl)ether.

24. Estradiol 3-p-chlorobenzoate 17-(1'-cyclopentadecenyl)ether.

25. Estradiol 3-p-chlorobenzoate 17-(1'-cyclotridecenyl)ether.

26. Estradiol 3-p-chlorobenzoate 17-(1'-cycloheptadecenyl)ether.

27. Estradiol 3-p-chlorobenzoate 17-(1'-cycloheneicosenyl)ether.

28. Estradiol 3-p-chlorobenzoate 17-(1'-cyclononacosenyl)ether.

29. Estradiol 3-benzoate 17-(1'-cyclooctenyl)ether.

30. Estradiol 3-benzoate 17-(1'-cycloheptenyl)ether.

31. Estradiol 3-benzoate 17-(1'-cyclononenyl)ether.

32. Estradiol 3-benzoate 17-(1'-cyclodecenyl)ether.

33. Estradiol 3-benzoate 17-(1'-cyclododecenyl)ether.

34. Estradiol 3-benzoate 17-(1'-cyclopentadecenyl)ether.

35. Estradiol 3-benzoate 17-(1'-cyclotridecenyl)ether.

36. Estradiol 3-benzoate 17-(1'-cycloheptadecenyl)ether.

37. Estradiol 3-benzoate 17-(1'-cycloheneicosenyl)ether.

38. Estradiol 3-benzoate 17-(1'-cyclononacosenyl)ether.

39. Estradiol 3-p-toluate 17-(1'-cyclododecenyl)ether.

40. Estradiol 3-benzoate 17-(1'-cyclodocosenyl)ether.

41. A compound of formula

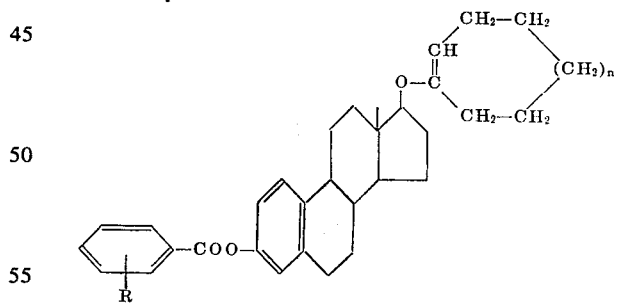

wherein R is selected from the group consisting of a lower alkyl, lower alkoxy, a cycloalkoxy, nitrogroup and an halogen atom, $n$ is an integer of from 1 to 6 inclusive.

42. A compound of formula

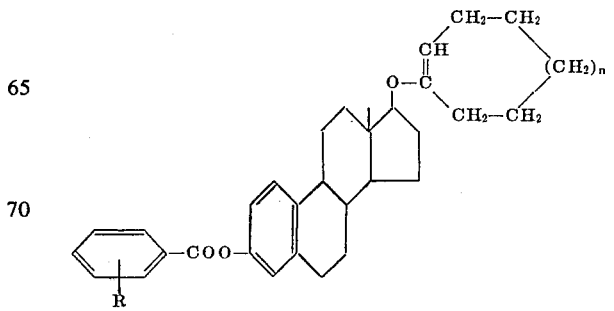

wherein $n$ is an integer of from 1 to 6 inclusive.

UNITED STATES PATENT OFFICE
CERTIFICATE OF CORRECTION

Patent No. 3,624,112                        Dated November 30, 1971

Inventor(s) Alberto Ercoli, Rinaldo Gardi, and Romano Vitali

It is certified that error appears in the above-identified patent and that said Letters Patent are hereby corrected as shown below:

On the cover sheet "July 25, 1965, Italy, No. 20106 A/69"
should read -- July 25, 1969, Italy, No. 20106 A/69 --.

Column 2, lines 51-65, the third compound reported in Table II as "Estradiol-3-anistate 17-(1'-cyclooctenyl)ether" should be ---Estradiol-3-anisate 17-(1'-cyclooctenyl)ether---

Column 6, line 36, first word, "17-(1'-A-cycloheneicosenyl)ether" should be ---17-(1'-cycloheneicosenyl)ether---

Column 8, Claim 42, the portion of the formula reading

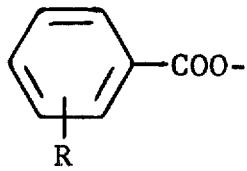     should read     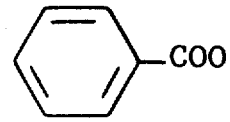

Signed and sealed this 11th day of July 1972.

(SEAL)
Attest:

EDWARD M.FLETCHER, JR.                ROBERT GOTTSCHALK
Attesting Officer                     Commissioner of Patents